US012715394B2

(12) United States Patent
Rubinov

(10) Patent No.: US 12,715,394 B2
(45) Date of Patent: Aug. 25, 2026

(54) VEHICLE ANTI-THEFT APPARATUS

(71) Applicant: Eli Rubinov, Ramat Gan (IL)

(72) Inventor: Eli Rubinov, Ramat Gan (IL)

( * ) Notice: Subject to any disclaimer, the term of this patent is extended or adjusted under 35 U.S.C. 154(b) by 0 days.

(21) Appl. No.: 18/837,608

(22) PCT Filed: Apr. 21, 2023

(86) PCT No.: PCT/IL2023/050410

§ 371 (c)(1),
(2) Date: Aug. 12, 2024

(87) PCT Pub. No.: WO2023/242829

PCT Pub. Date: Dec. 21, 2023

(65) Prior Publication Data

US 2025/0136045 A1 May 1, 2025

(30) Foreign Application Priority Data

Jun. 13, 2022 (IL) ........................................ 293881

(51) Int. Cl.
*B60R 25/043* (2013.01)

(52) U.S. Cl.
CPC ................................ *B60R 25/043* (2013.01)

(58) Field of Classification Search
CPC ............................ B60R 25/04; B60R 25/043
See application file for complete search history.

(56) References Cited

U.S. PATENT DOCUMENTS 1,321,854 A * 11/1919 Simpson ................. B60R 25/04 116/33
1,456,640 A 5/1923 Lowry et al.
4,690,240 A 9/1987 Russo
5,052,204 A * 10/1991 Millar ................... B60R 25/043 70/237
5,612,878 A 3/1997 Joao
5,917,406 A * 6/1999 Postel ................... B60R 25/043 340/425.5

FOREIGN PATENT DOCUMENTS

WO 88/07462 A1 10/1988
WO 94/18038 A1 8/1994

* cited by examiner

*Primary Examiner* — Levi Gannon
(74) *Attorney, Agent, or Firm* — AlphaPatent Associates Ltd.; Daniel J. Swirsky

(57) ABSTRACT

A vehicle anti-theft apparatus (10), including: a valve (18) being irremovably assembled to an exhaust pipe (16) of an engine (12) of the vehicle, the valve (18) being controllable (59) to close upon a theft event (57).

5 Claims, 10 Drawing Sheets

16
32
34

16
34
36

VEHICLE ANTI-THEFT APPARATUS

TECHNICAL FIELD

The invention relates to the field of vehicle anti-theft devices. More particularly, the invention relates to a method and apparatus for avoiding vehicle theft.

BACKGROUND

Prevention of vehicle theft systems conventionally include electronic systems, such as for shutting down the engine either through the ignition system or fuel pump.

However, these systems can be bypassed by a car thief quite easily

There is a long felt need to provide a solution to the above-mentioned and other problems of the prior art.

SUMMARY

A vehicle anti-theft apparatus, including:

a valve being irremovably assembled to an exhaust pipe of the vehicle's engine, the valve being controllable to close upon a theft event.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
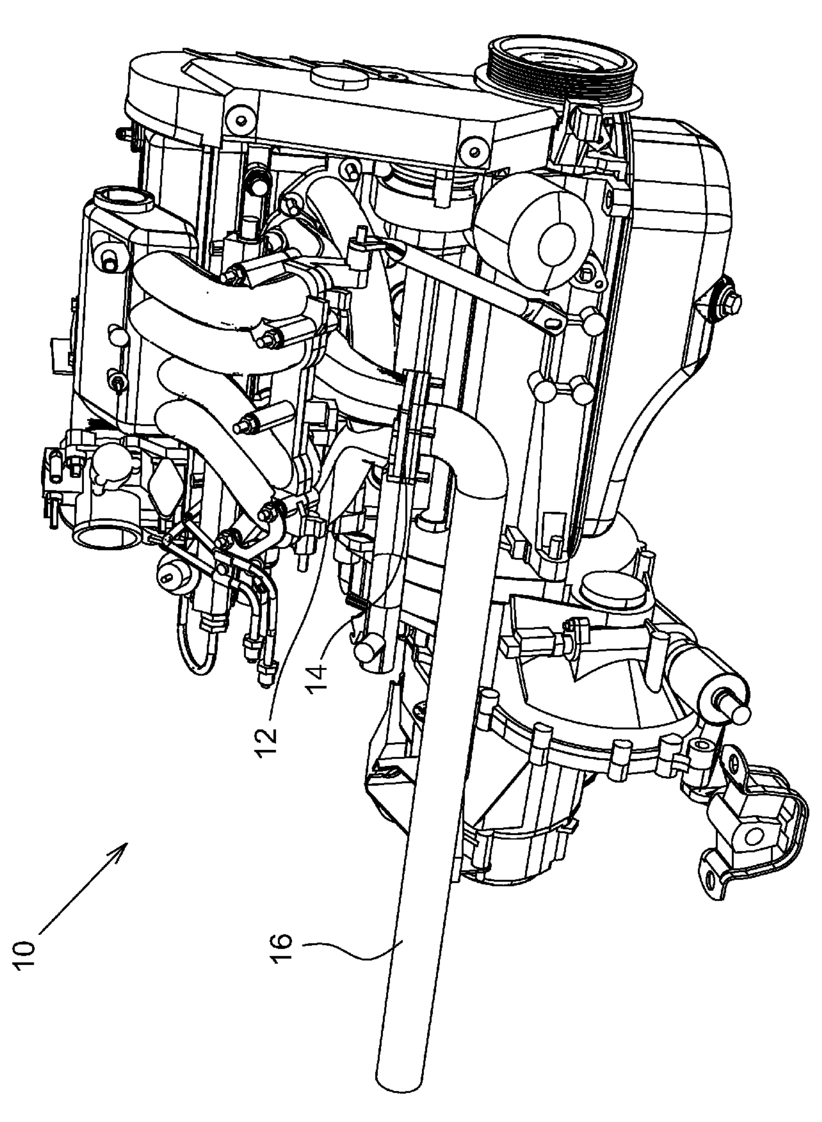
FIG. 1 depicts a prior art vehicle engine.

FIG. 1 depicts a prior art vehicle engine.

Figure 2:
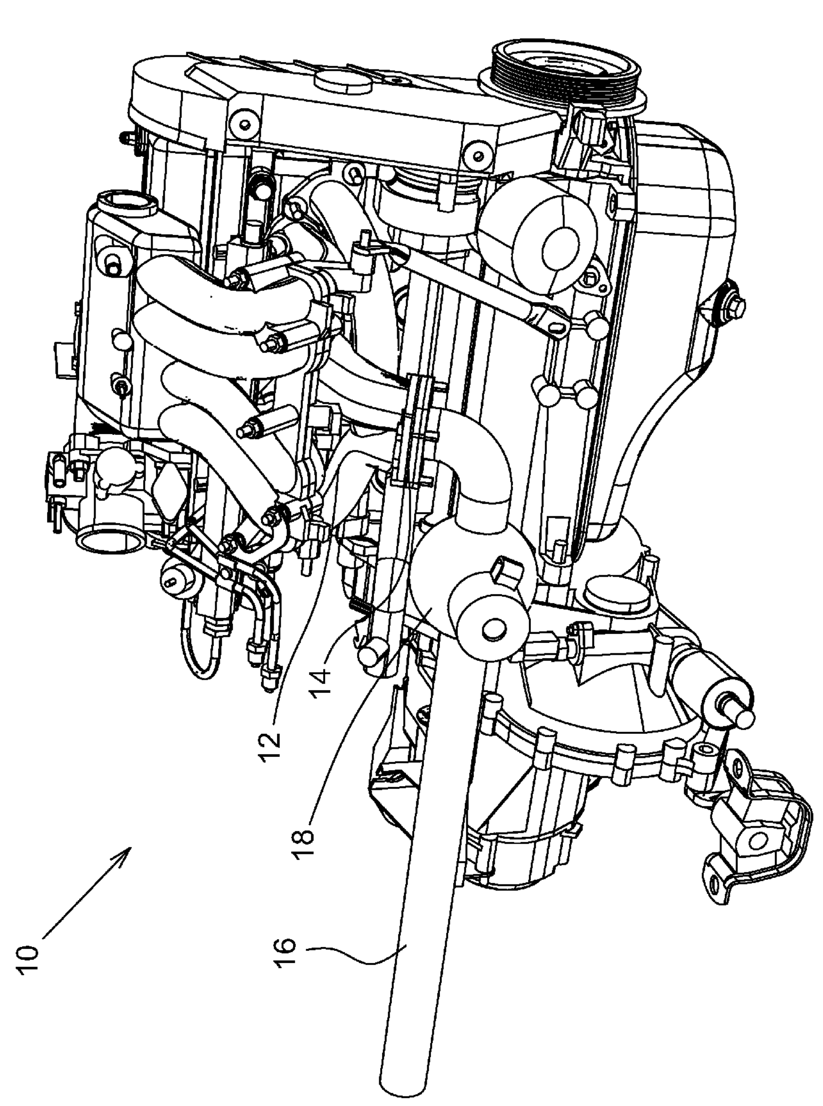
FIG. 2 depicts the vehicle engine including an anti-theft apparatus according to one embodiment of the invention.

FIG. 2 depicts the vehicle engine including an anti-theft apparatus according to one embodiment of the invention.

An anti-theft apparatus 10 for a vehicle includes a valve 18 assembled to the exhaust pipe 16 of an engine 12, preferably welded thereto, thus avoiding a thief to remove valve 18.

Figure 3:
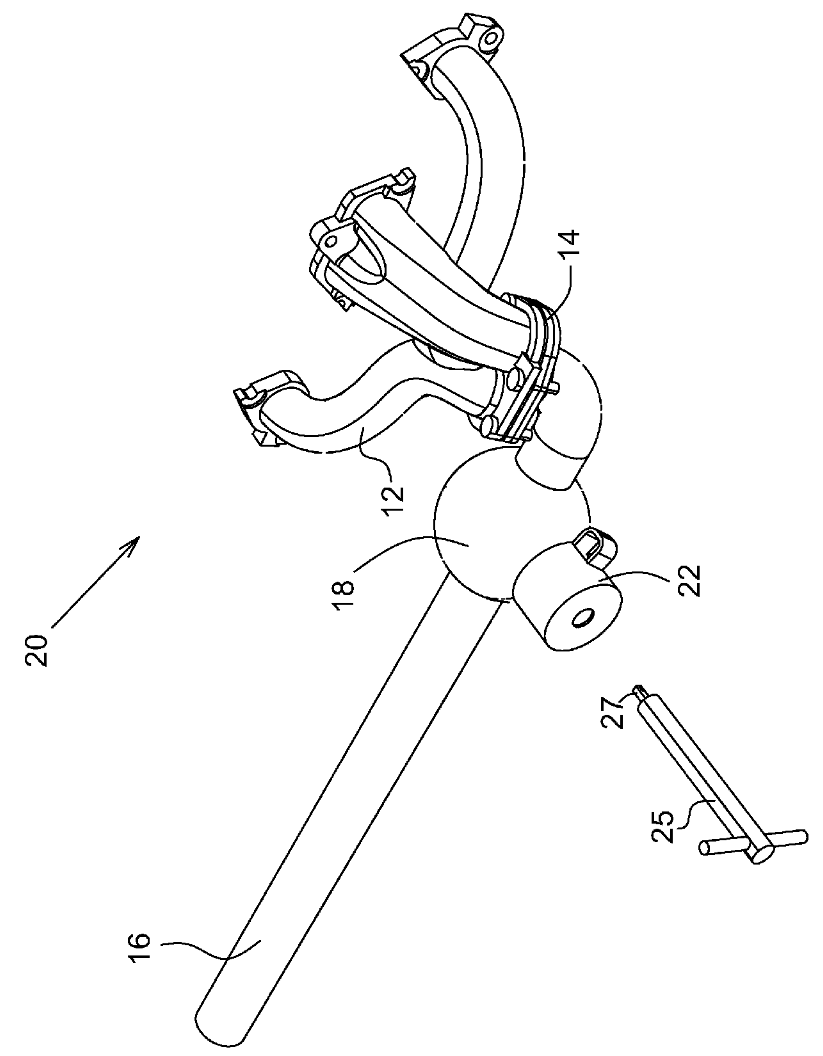
FIG. 3 depicts one embodiment of blocking the exhaust pipe of FIG. 2.

FIG. 3 depicts one embodiment of blocking the exhaust pipe of FIG. 2.

A flap 34 (not shown) may be slideable (52) for blocking exhaust pipe 16 upon theft and for releasing for allowing driving.

Figures 4, 5:
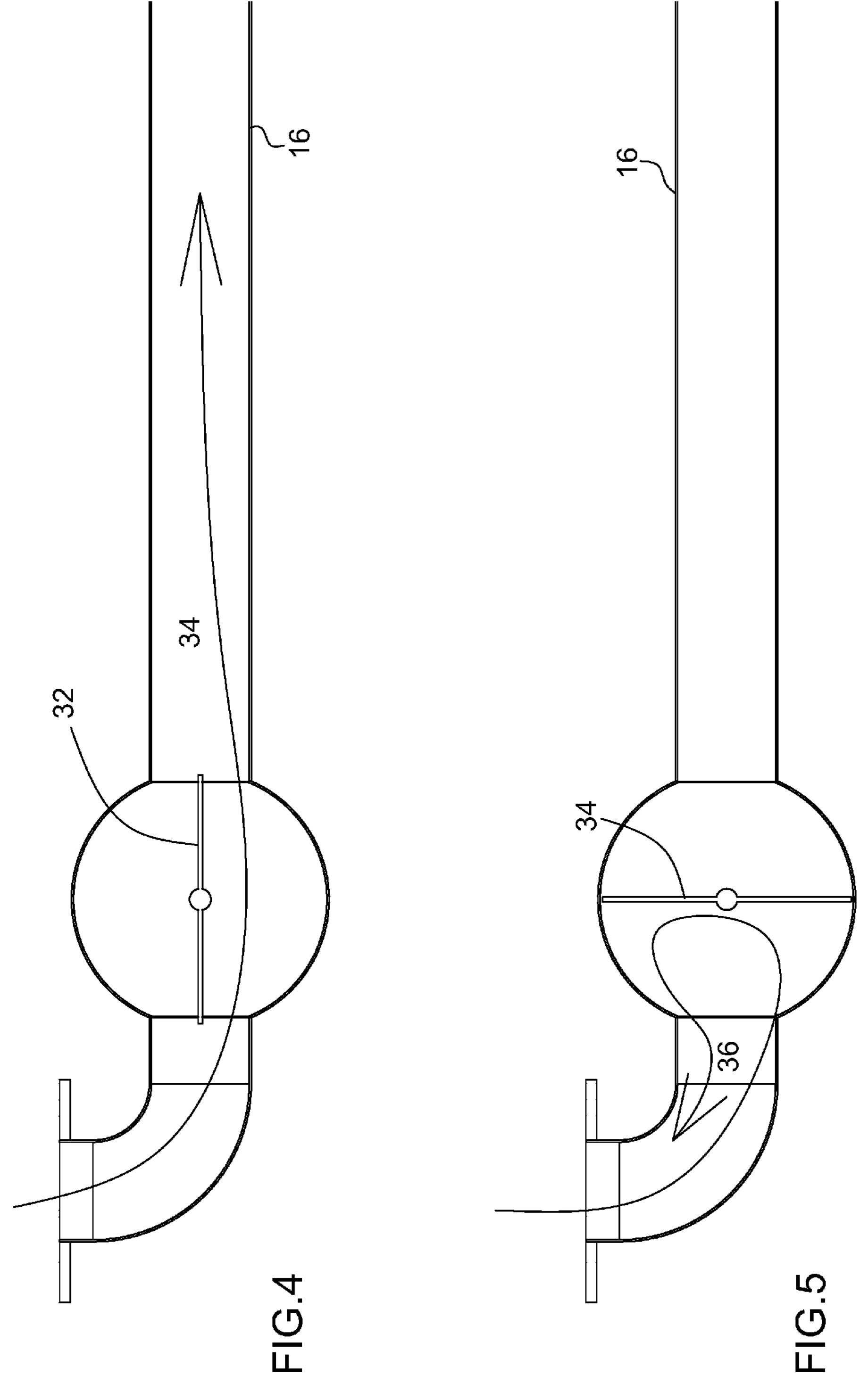
FIG. 4 depicts another embodiment of blocking the exhaust pipe of FIG. 2 upon allowing driving.
FIG. 5 depicts the embodiment of FIG. 4 upon disallowing driving.

FIG. 4 depicts another embodiment of blocking the exhaust pipe of FIG. 2 upon allowing driving.

FIG. 5 depicts the embodiment of FIG. 4 upon disallowing driving.

Figure 6:
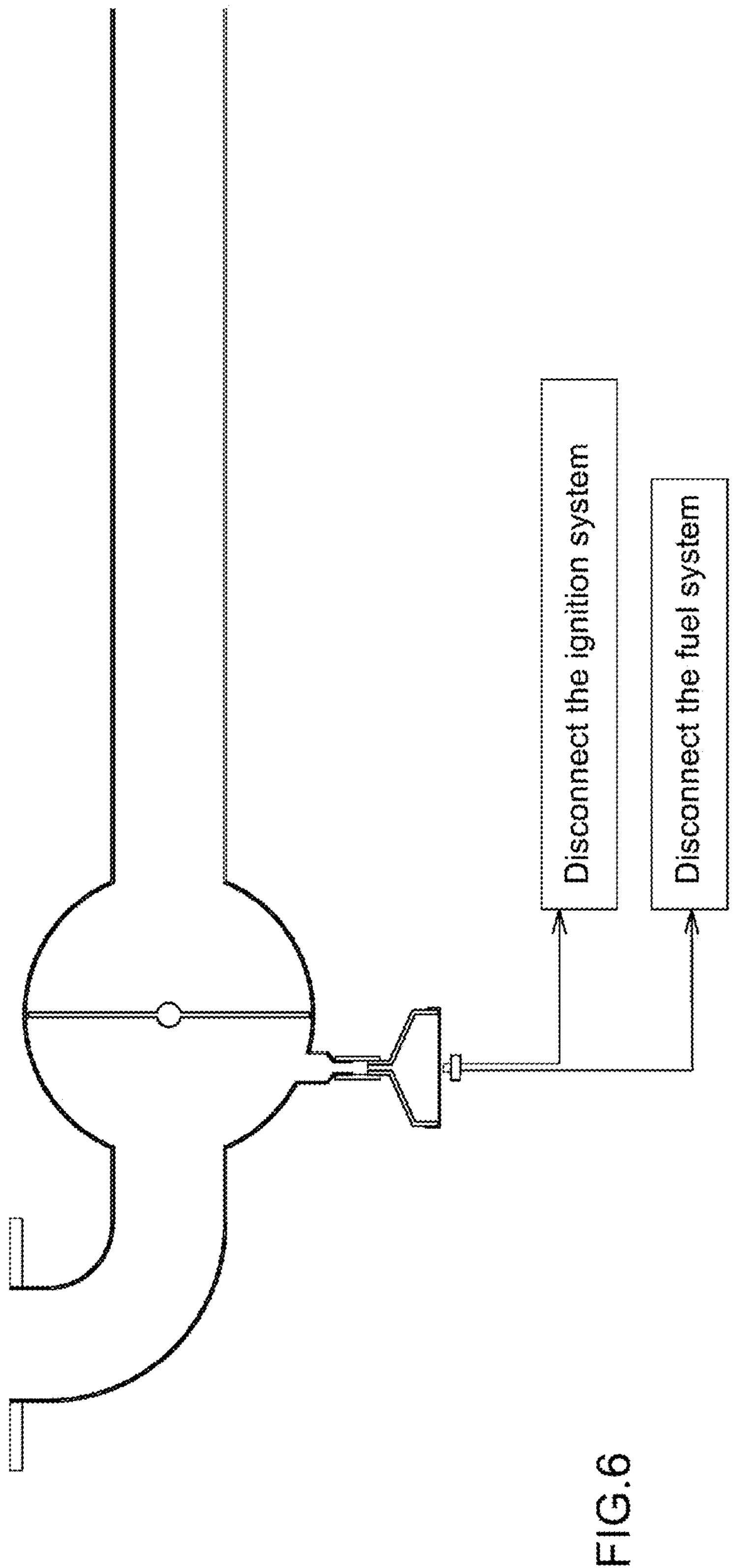
FIG. 6 is a perspective cut view of FIG. 4 allowing the driving.

According to another embodiment, flap 34 may be rotatable 54 in relation to pipe 16 for blocking exhaust pipe 16 upon theft (FIG. 5) and for releasing for allowing driving (FIG. 6).

FIG. 6 is a perspective cut view of FIG. 4 allowing the driving.

A pin 30 (not shown) inserted into a hole 58 (not shown) of a plate 50 (not shown) fixed to flap 34 and an axle 56 (not shown) does not allow rotating flap 34.

Figure 7:
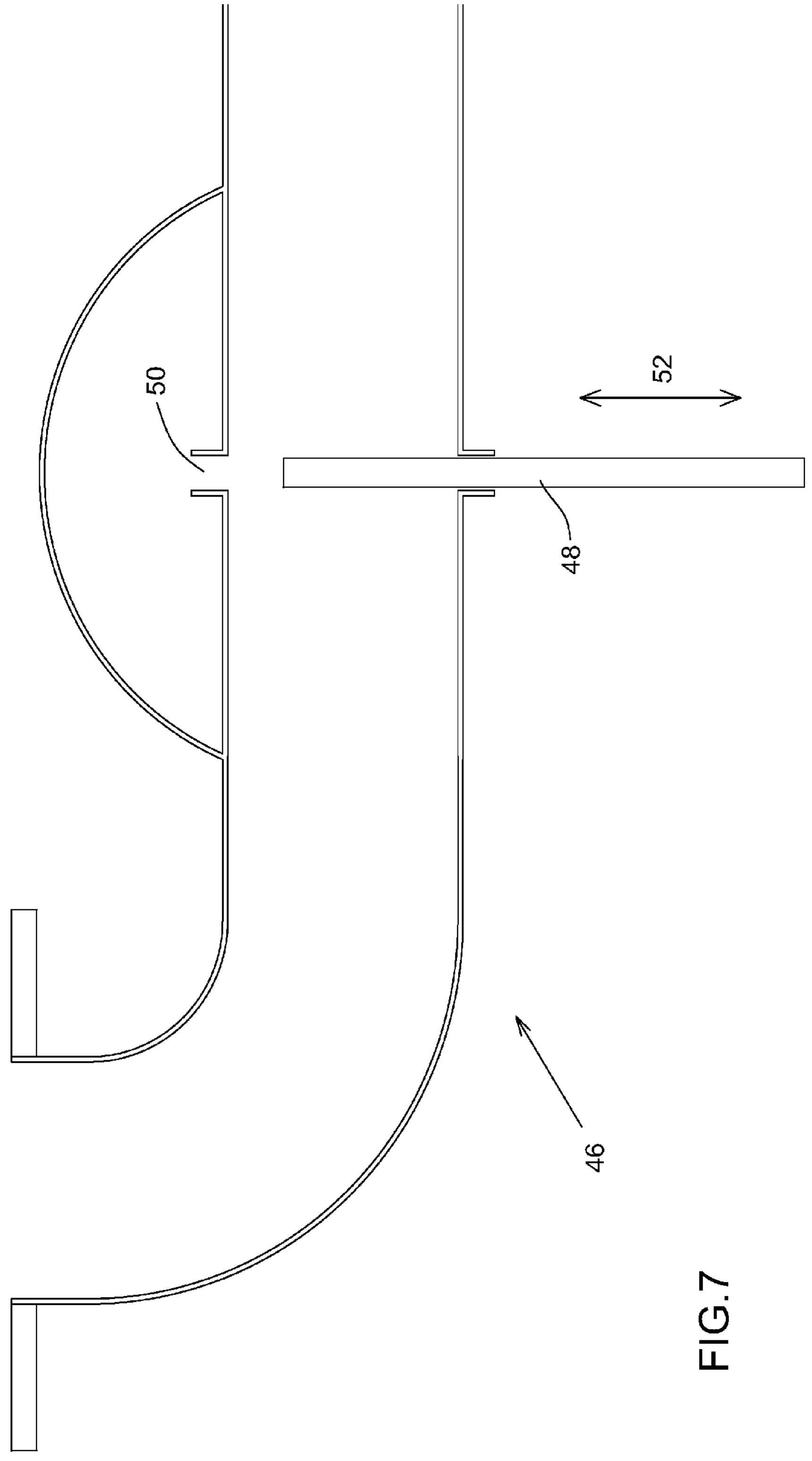
FIG. 7 is the view of FIG. 6 upon a theft event.

FIG. 7 is the view of FIG. 6 upon a theft event.

A controller 66 upon detecting a theft event 57, operates a solenoid 35 to slide (62A) pin 30 out of plate 50.

Sliding 62A of pin 30 out of hole 58 of plate 50 allows a rotational spring 24 to rotate flap 34 the closed state of FIG. 5 shown in FIG. 6.

Controller 66 is cannot rotate flap 34 to the open state of FIG. 4 against spring 24. Thus, the thief cannot drive the vehicle even upon taking control of controller 66 to cancel theft event 57.

Axle 56 includes a niche 31.

Figure 8:
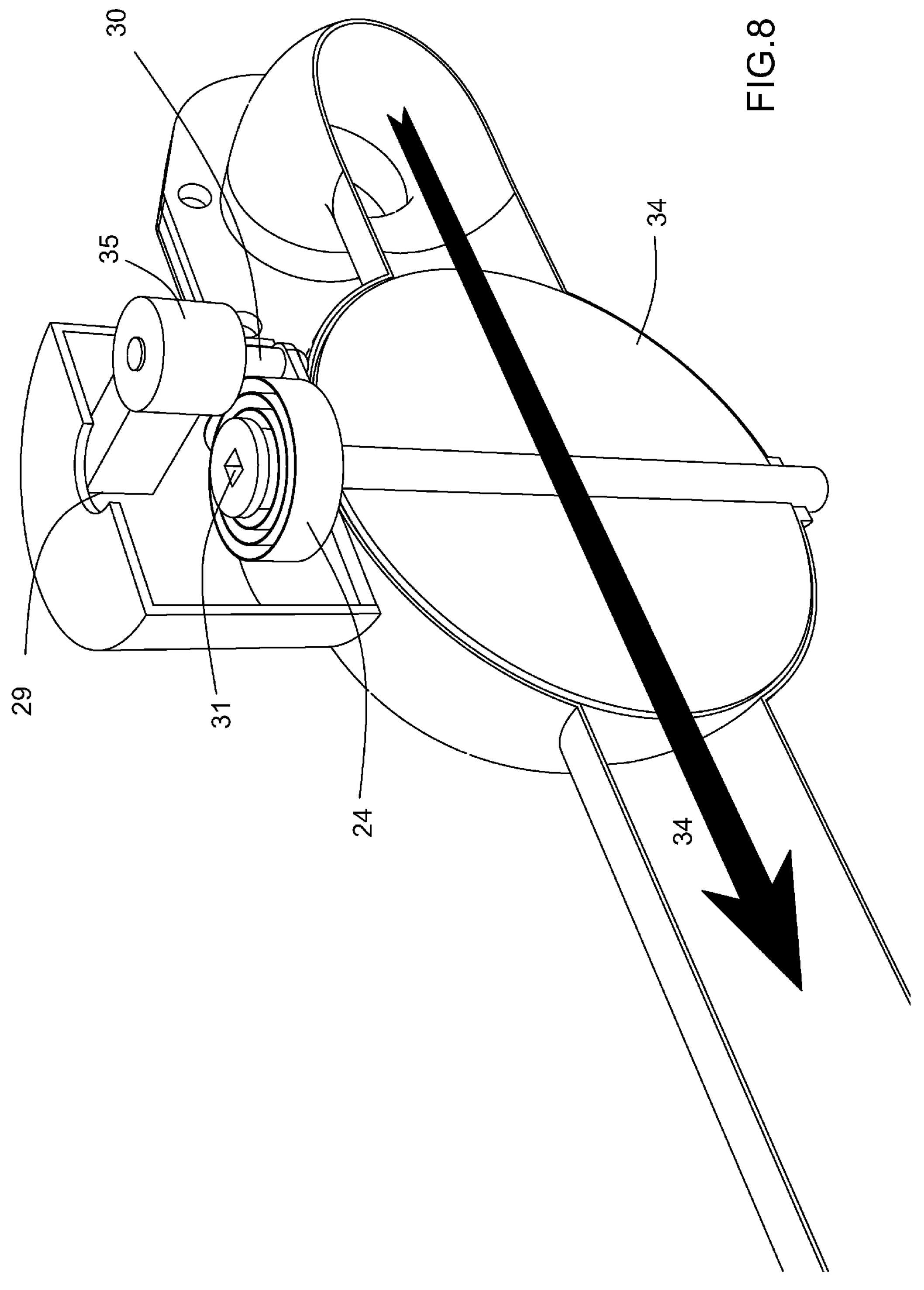
FIG. 8 depicts the first step of opening the exhaust pipe which was closed by the theft event of FIG. 7.

FIG. 8 depicts the first step of opening the exhaust pipe which was closed by the theft event of FIG. 7.

Opening exhaust pipe 16 is applicable by using a mechanical key 25

Figure 9:
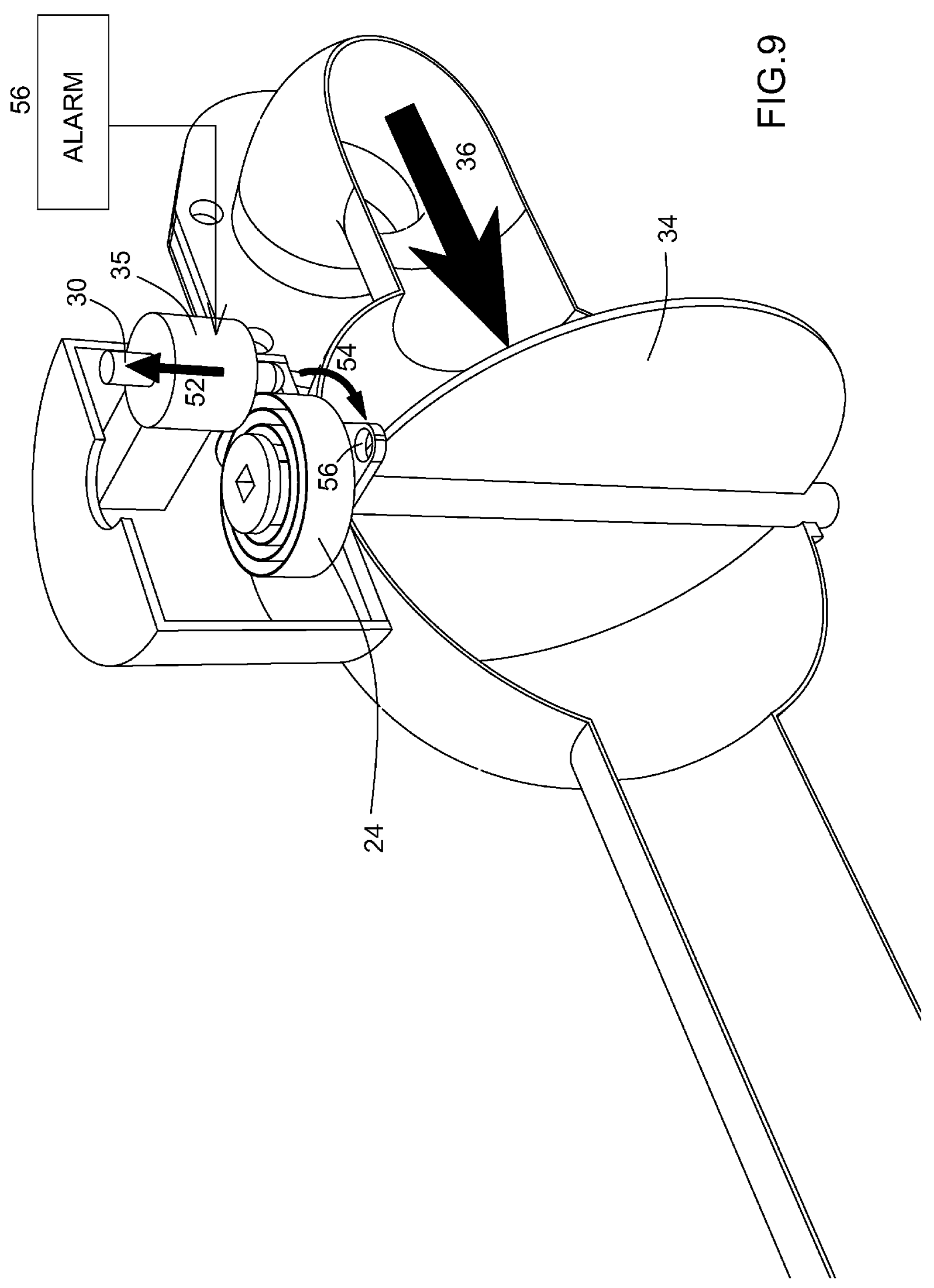
FIG. 9 depicts the key of FIG. 8 brought towards the valve of FIG. 2.

FIG. 9 depicts the key of FIG. 8 brought towards the valve of FIG. 2.

Head 27 of mechanical key 25 is threaded through a hole 29 of the package 22 of valve 18 disposed near engine 12. Only the owner 70 or another authorized person has this unique mechanical key 25 including a unique head 27.

Figure 10:
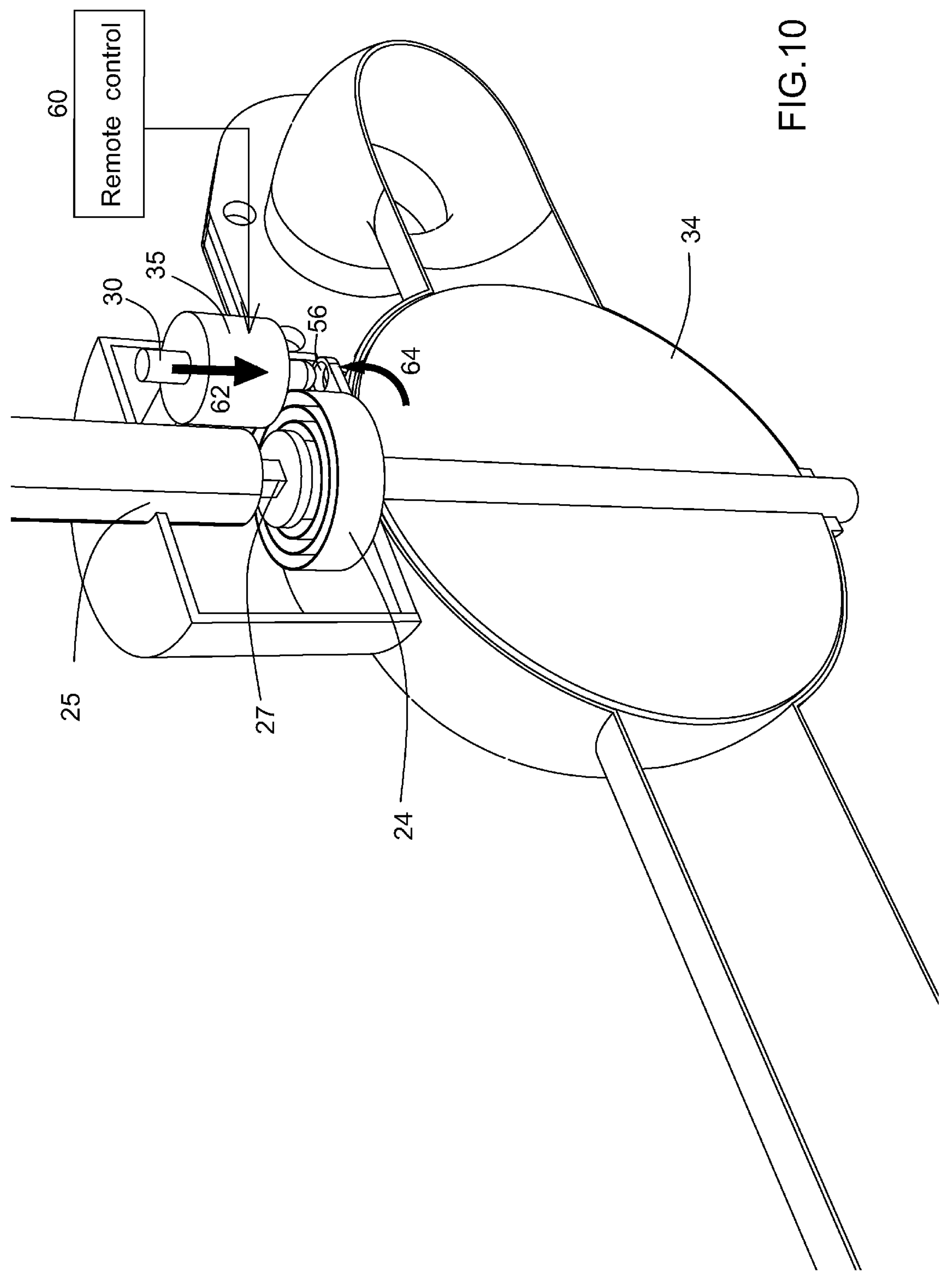
FIG. 10 is the view of FIG. 7 upon performing the step of FIG. 8.
Figure 11:
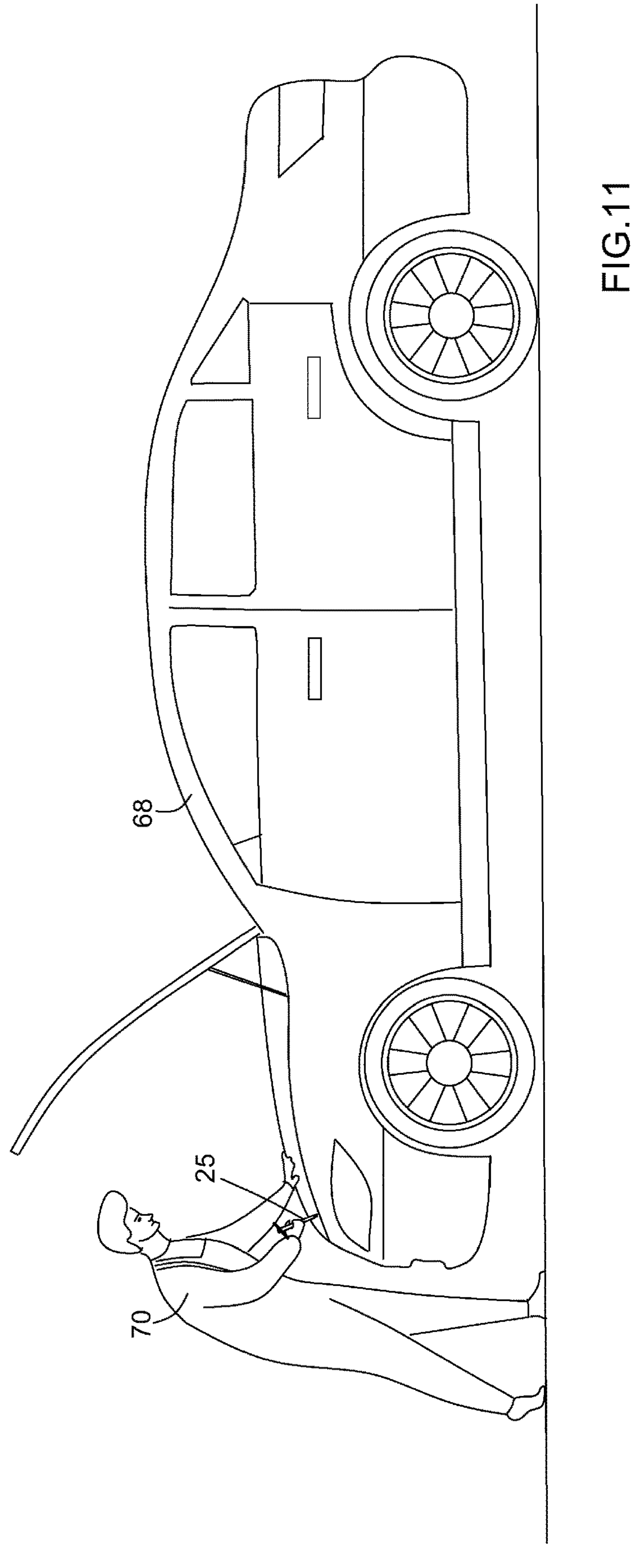
FIG. 11 depicts a vehicle owner using a unique mechanical key to access and operate an anti theft apparatus installed on the vehicle.

FIG. 10 is the view of FIG. 7 upon performing the step of FIG. 8.

At the first step, shown in FIG. 8, the owner inserts head 27 of key 25 into niche 31.

At the second step, the owner rotates key 25 to rotate (64) axle 56 and flap 34 and plate 50 against spring 24.

At the third step, the owner control controller 66 to slide (52B) pin 30 back into hole 58 of plate 50.

At the fourth step, the owner may remove key 25.

Thus, in one aspect, the invention is directed to a vehicle anti-theft apparatus (10), including:

a valve (18) being irremovably assembled to an exhaust pipe (16) of an engine (12) of the vehicle, the valve (18) being controllable (59) to close upon a theft event (57).

The valve (18) preferably is not controllable to open the valve (18), but rather opening the valve requires physical operation.

The valve (18) may include a mechanical spring (24) tending to close the valve (18), and the control (59) to close the valve (18) may include a control (59) to release the mechanical spring (24), such as by removing pin 30.

The vehicle anti-theft apparatus (10) may further include:

a unique key (25) being accessible to the valve (18) for opening thereof.

In the figures and description herein, the following reference numerals (Reference Signs List) have been mentioned:

numeral 10 denotes the vehicle anti-theft apparatus according to one embodiment of the invention;
12: vehicle engine;
14: connection of exhaust pipe 16 to engine 12;
16: exhaust pipe;
18: valve;
19: welding or other irremovable assembling;
19: hole;
22: package;
24: spring;
30: pin;
31: unique shaped male and/or female member;
34: flap of valve 18;
35: solenoid;
36: exhaust flow;
50: plate;
52: sliding of flap 34;
54: rotation of flap 34 to close;
56: axle fixed to flap 34;
57: theft event;
58: hole for housing pin 30;
59: control by controller 66;
62A: sliding out of hole 58;
62B: sliding into hole 58;
64: rotation of flap 34 to open valve 18;
66: controller;
68: vehicle;
70: owner of vehicle 68;

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A vehicle anti-theft apparatus (10), comprising:
a valve (18) irremovably assembled to an exhaust pipe (16) of an engine (12) of the vehicle, the valve (18) comprising
a flap (34) movable between an open position and a closed position of the exhaust pipe (16),
a mechanical spring (24) biasing the flap (34) toward the closed position, and
a locking pin (30) retaining the flap (34) in the open position until withdrawn; and
a controller (66) configured to detect a theft event (57) and, in response, operate a solenoid (35) to withdraw the locking pin (30) from a hole (58),
thereby releasing the mechanical spring (24) to move the flap (34) to the closed position,
wherein the controller (66) is not configured to open the flap (34), and the flap (34) is manually openable only by a unique mechanical key (25) engageable with a shaped recess (31).

2. The apparatus of claim 1, wherein the solenoid (35) is positioned to slide the locking pin (30) in a direction transverse to an axle (56).

3. The apparatus of claim 1, wherein the mechanical spring (24) is a rotational spring configured to rotate the flap (34) toward the closed position.

4. The apparatus of claim 1, wherein the unique mechanical key (25) is insertable through an opening (29) of a package (22) disposed near the engine (12).

5. The apparatus of claim 1, wherein the flap (34) is manually openable only by using the unique mechanical key (25) to withdraw the locking pin (30) from a hole (58) of a plate (50) fixed to the flap (34) and an axle (56).

* * * * *